United States Patent [19]
Tonejc

[11] Patent Number: 5,689,609
[45] Date of Patent: Nov. 18, 1997

[54] OPTICAL COUPLING CONFIGURATION

[75] Inventor: Vinko Tonejc, Berlin, Germany

[73] Assignee: Siemens Aktiengesellschaft, Munich, Germany

[21] Appl. No.: 694,103

[22] Filed: Aug. 8, 1996

[30]    Foreign Application Priority Data

Aug. 8, 1995  [DE]  Germany .................. 195 30 684.8

[51] Int. Cl.[6] .................................................. G02B 6/36
[52] U.S. Cl. .............................. 385/147; 385/76; 385/56; 385/59
[58] Field of Search ........................ 385/147, 53, 76, 385/55, 56, 58, 59

[56]    References Cited

U.S. PATENT DOCUMENTS

| 5,481,634 | 1/1996 | Anderson et al. | 385/76 |
| 5,530,783 | 6/1996 | Belopolsky et al. | 385/53 |

FOREIGN PATENT DOCUMENTS

| 78 08 002 | 6/1978 | Germany . |
| 38 34 394 C2 | 4/1990 | Germany . |
| 42 37 941 A1 | 5/1994 | Germany . |

*Primary Examiner*—John Ngo
*Attorney, Agent, or Firm*—Herbert L. Lerner; Laurence A. Greenberg

[57]    ABSTRACT

A coupling configuration includes a flange having a rear side on which an optical element and a front side on which a receiving tube are disposed. A plug prong can be introduced into an opening in the receiving tube until it meets a stop. Embedded in the flange is a metal part which forms the stop and which has at least one extension protruding from the flange material.

5 Claims, 2 Drawing Sheets

OPTICAL COUPLING CONFIGURATION

BACKGROUND OF THE INVENTION

FIELD OF THE INVENTION

The invention relates to an optical coupling configuration including a flange, the flange has a front side on which a receiving tube is disposed, the tube has an opening in which a plug prong can be introduced as far as a stop formed by a metal part, and the flange has a back side on which an optical element is disposed and aimed at the opening.

German Published, Non-Prosecuted Patent Application DE 42 37 941 A1 describes an optical coupling configuration in which a mounting flange and a slit receiving tube are integrally constructed. An optical element is disposed on the back side of the flange, opposite the receiving tube, and is aimed at the opening of the receiving tube. An optical fiber plug prong can be introduced into the receiving tube until it comes to a stop at a screenlike, shieldlike or bafflelike partition. The replicability of the plug prong position in the axial direction is determined by the deformation of the stop surface or partition (which increases with the number of plugging operations).

With a view toward the problems of mechanical decoupling of the fiberoptical wave guide and the optical element (photosemiconductor element), a coupling configuration of the type referred to at the outset that is similar to the construction described in the previous paragraph can be learned from German Utility Model 78 08 002. It has a thin metallic separating plate disposed internally between the receiving tube and a mount for the optical element.

Still-unsolved problems thus exist in terms of the relatively slight load-bearing capacity of the flange, which is preferably made from injection-molded material, the shielding against electromagnetic waves, which is in need of improvement, and heat dissipation.

SUMMARY OF THE INVENTION

It is accordingly an object of the invention to provide an optical coupling configuration, which overcomes the hereinafore-mentioned disadvantages of the heretofore-known devices of this general type and which does so with simple technological provisions.

With the foregoing and other objects in view there is provided, in accordance with the invention, an optical coupling configuration, comprising a metal part forming a stop and having at least one extension; a flange formed by embedding material on the metal part with the at least one extension protruding from the flange material, the flange having front and back sides; a receiving tube disposed on the front side, the receiving tube having an opening formed therein; a plug prong to be introduced in the opening up to the stop formed by the metal part; and an optical element disposed on the back side and aimed at the opening.

A first substantial advantage of the coupling configuration according to the invention is that with the embedded metal part, which is an economical mass-produced part, the stop function or spacing function of the partition for the plug prong is greatly stabilized. Moreover, due to the outward-protruding extension, access to the metal part for electrical shielding, potential equalization, and the absorption of insertion or plugging forces is possible. Another essential advantage of the metal part is its aptitude for purposeful heat dissipation.

The extension or extensions of the metal part form precise protrusions or engagement points for production devices or tools for manufacture and optionally for necessary adjustment work. The external coupling function with the plug prong is advantageously entirely capable of being performed by an economical material (such as injection molded plastic).

In accordance with another feature of the invention, the at least one extension is constructed as a mounting foot or mounting prong, in order to enable absorption of insertion forces and simultaneous tension relief, grounding and shielding of the coupling configuration of the invention.

In accordance with a further feature of the invention, the metal part has at least one rearward extension, on which the optical element aimed at the receiving tube is fixed. Advantageously, the rear extensions can provide plane free surfaces suitable for laser spot-welding and thus can already form a reference plane for the optical element. The extensions may be machined so precisely, with reference to the region of the metal part that forms the stop surface, that no adjustment of the optical element in the axial direction is necessary.

In accordance with an added feature of the invention, there are provided detent fingers extending from the front side of the flange. Thus all of the external coupling functions, namely the reception of the plug prong and the fixation of a housing that carries the plug prong, are performed by devices disposed on the front side of the flange, and these devices can advantageously be made by injection molding.

In accordance with a concomitant feature of the invention, the coupling configuration is constructed as a duplex coupling configuration, with two optical elements, two receiving tubes located opposite them, and a single shared metal part.

Within the scope of the present invention, an optical element should be understood to also include an electrooptical or optoelectronic transducer element, for instance a laser diode or a photodiode.

Other features which are considered as characteristic for the invention are set forth in the appended claims.

Although the invention is illustrated and described herein as embodied in an optical coupling configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
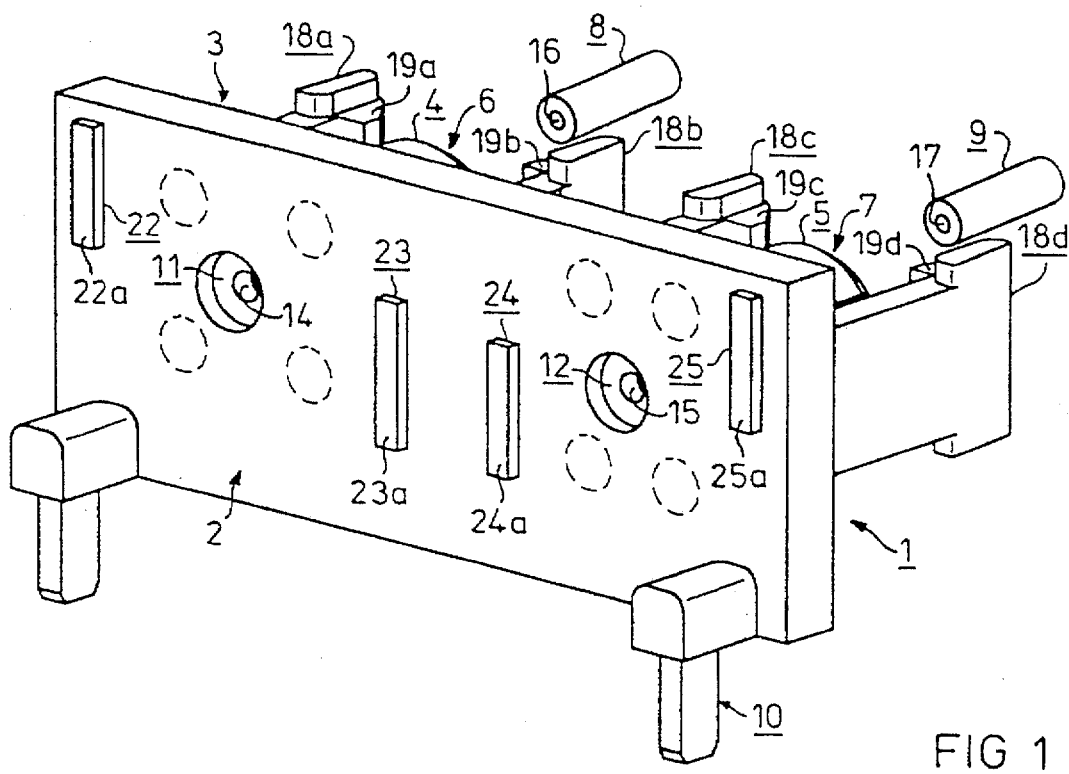
FIG. 1 is a diagrammatic, perspective view of an optical coupling configuration according to the invention.

Referring now to the figures of the drawings in detail and first, particularly, to FIG. 1 thereof, there is seen an optical coupling configuration which includes a flange 1 that is formed from a plastic by injection molding. The flange 1 has opposite back and front sides 2, 3. Two receiving tubes 4, 5 which are slit and are only partially visible, are disposed on the front side 3. The receiving tubes have through openings 6, 7 that are aimed at optical elements which are not shown in FIG. 1. A plug prong 8, 9 can be introduced axially into the openings 6, 7 as far as a partition 11, 12 that narrows the tube opening and acts as a stop. A metal part 10 that forms the partitions 11, 12 is embedded in the flange 1. The location of the receiving tubes 4, 5 is adapted to through bores 14, 15 in the partitions. The metal part 10 thus forms stops that narrow the openings in the receiving tubes 4, 5. The stops have front surfaces which are not visible in FIG. 1 that act as stable stop surfaces for the plug prongs 8, 9. Each of the plug prongs 8, 9 have one central fiber-optical waveguide 16, 17. Detent fingers 18a–18d which extend from the front side 3 of the flange 1 lock into place with detent protrusions 19a–19d in corresponding indentations in non-illustrated plug prong housings and fix them in a coupling position.

Figure 2:
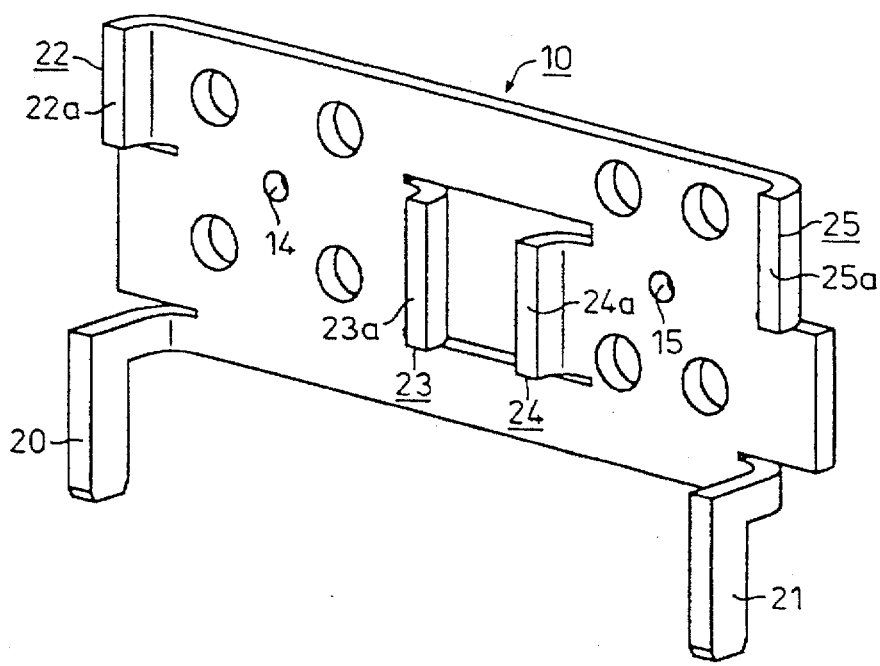
FIG. 2 is a perspective view of a metal part.

As FIG. 2 also shows, the metal part 10 has a plurality of extensions. Two extensions 20, 21 are first bent at an angle and then continue downward in the form of assembly feet or assembly prongs. A total of four rear-extending extensions 22–25 have flat or smooth end surfaces 22a–25a which act as mounting surfaces for optical elements as will be described in further detail below.

Figure 3:
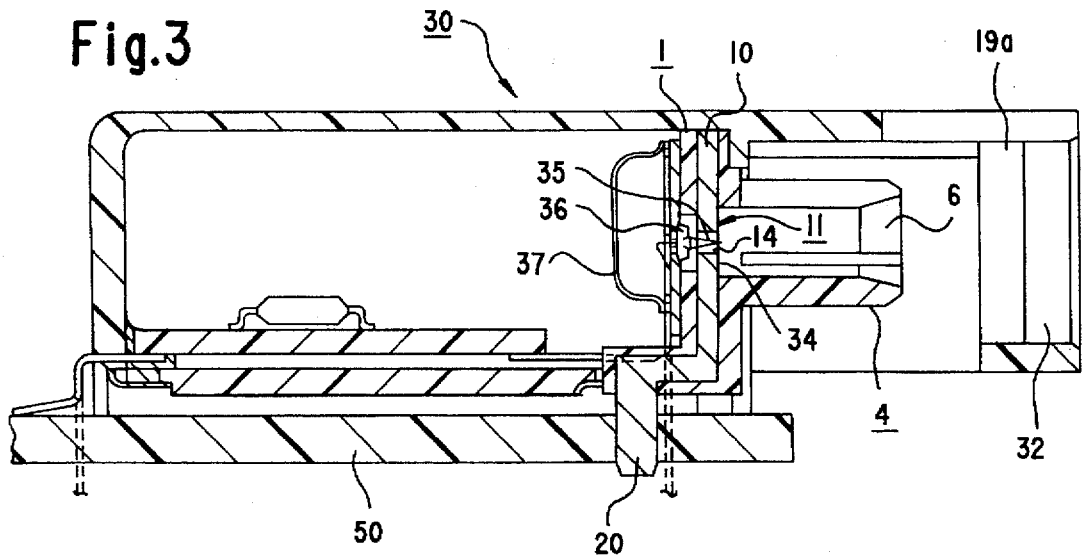
FIG. 3 is a longitudinal-sectional view of an electrooptical module.

FIG. 3 shows a longitudinal section through an electrooptical module 30, which includes the flange 1 and the slit receiving tube 4 which is surrounded by a receiving antechamber 32. A commercially available, non-illustrated SC plug prong housing can be inserted by the plug prong 8 of FIG. 1 into the antechamber 32. Once the housing has been inserted, the detent protrusion 19a locks in a corresponding housing recess. The plug prong 8 of FIG. 1, which is supported in a known manner in the plug prong housing with axial spring action, is pressed in the plugged-in state against a stop surface 34 of the partition 11 of the metal part 10. A light path 35 passes through the bore 14 as indicated for optical coupling with an optical element in the form of a photodiode 36 that is encapsulated in a metal housing 37.

Figure 4:
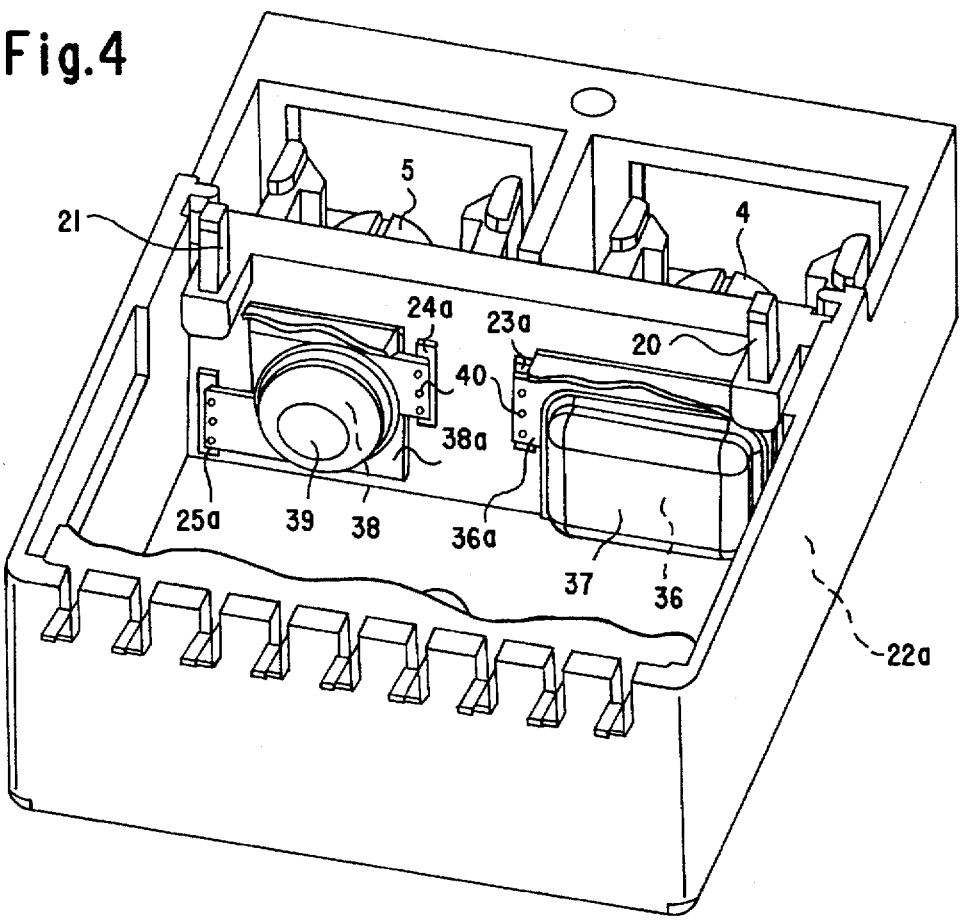
FIG. 4 is a bottom perspective view of the electrooptical module with a partially opened bottom plate.

As FIG. 4 shows, in a coupling configuration which is constructed as a duplex coupling configuration, a laser diode 38 is also provided as a further optical element, disposed in a metal housing 39. The optical elements 36, 38 are welded by metal base plates 36a, 38a thereof to the flat end surfaces 22a–25a of the extensions 22–25 by laser spot welds 40.

The metal part 10, which has its stop surface 34 that is dimensionally and positionally accurate even after many cycles of being plugged in and out, and which is sprayed or embedded with plastic material to form the flange 1, assures excellent, accurately reproducible axial positioning of the optical waveguide 16 and plug prong 8 to be coupled, relative to the respective optical element 36. Moreover, the metal part 10 serves to absorb and dissipate tensile or insertion forces at a printed circuit board 50 shown in FIG. 3, because the mounting feet 20, 21 are inserted into corresponding bores in the printing circuit board 50 and fixed there. As a further function, the metal part 10 acts to provide electromagnetic shielding of the flange region and therefore to reduce the influence of external interfering radiation or radiated noise. At the same time, a defined potential for the housings 37, 39 of the optical elements is created by the metal part 10 through the weld connections 40 seen in FIG. 4. The flat end surfaces 22a–25a act as easy-to-make, highly precise guide surfaces for fixing the optical elements 36, 38 in the axial direction.

Finally, the metal part 10 serves to provide extremely effective heat dissipation from the optical elements. The mechanical coupling function, that is the guidance and reception of the plug prongs 8, 9 and the fixation of the plug prong housings, can continue to be carried out in an advantageous way, with the aid of the receiving tubes or detent fingers, by plastic parts that are simple to make by injection molding.

I claim:

1. An optical coupling configuration, comprising:
   a flange with a front side and a back side;
   a metal part embedded in said flange, said metal part forming a stop and having at least one extension protruding from said flange;
   a receiving tube disposed on said front side, said receiving tube having an opening formed therein;
   said opening being adapted to receive a plug prong to be introduced in said opening up to said stop formed by said metal part; and
   an optical element disposed on said back side and aimed at said opening.

2. The coupling configuration according to claim 1, wherein said at least one extension is a mounting foot or mounting prong.

3. The coupling configuration according to claim 1, wherein said metal part has at least one rearward extension on which said optical element is fixed.

4. The coupling configuration according to claim 1, including detent fingers extending from said front side of said flange.

5. The coupling configuration according to claim 1, including another optical element and another receiving tube, said receiving tubes and said optical elements being on opposites sides of said metal part in a duplex configuration.

* * * * *